W. T. SPRING.
APPARATUS FOR PRODUCING CONCRETE AND PLASTIC WORK.
APPLICATION FILED APR. 27, 1921.
1,438,506.
Patented Dec. 12, 1922.
4 SHEETS—SHEET 3.
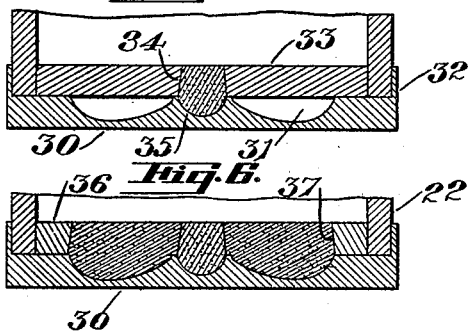
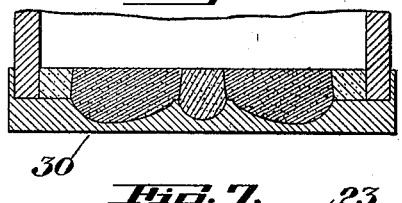
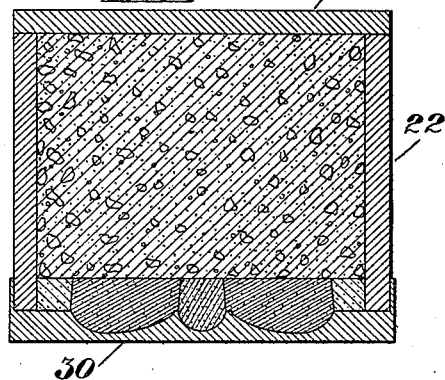
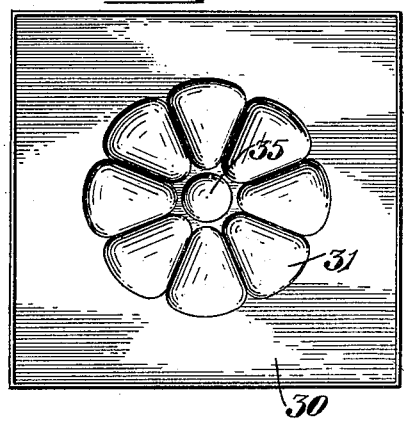
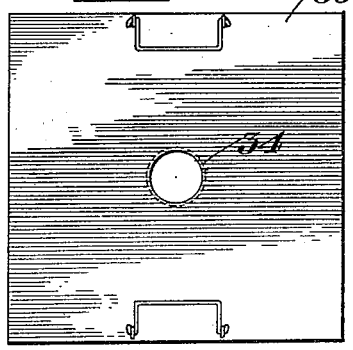
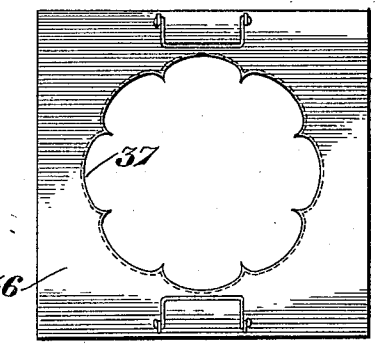
INVENTOR.
WILBERT T. SPRING.
BY Chas E. Townsend
ATTORNEY.

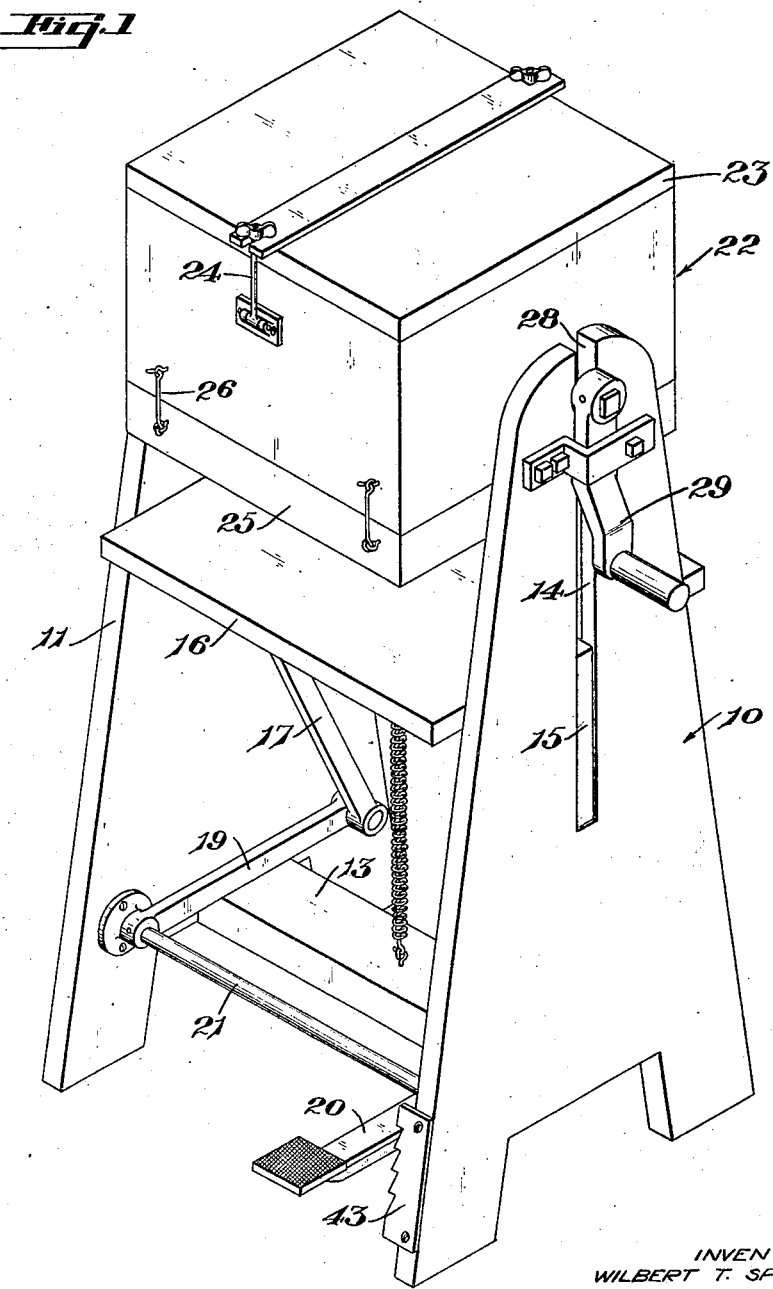

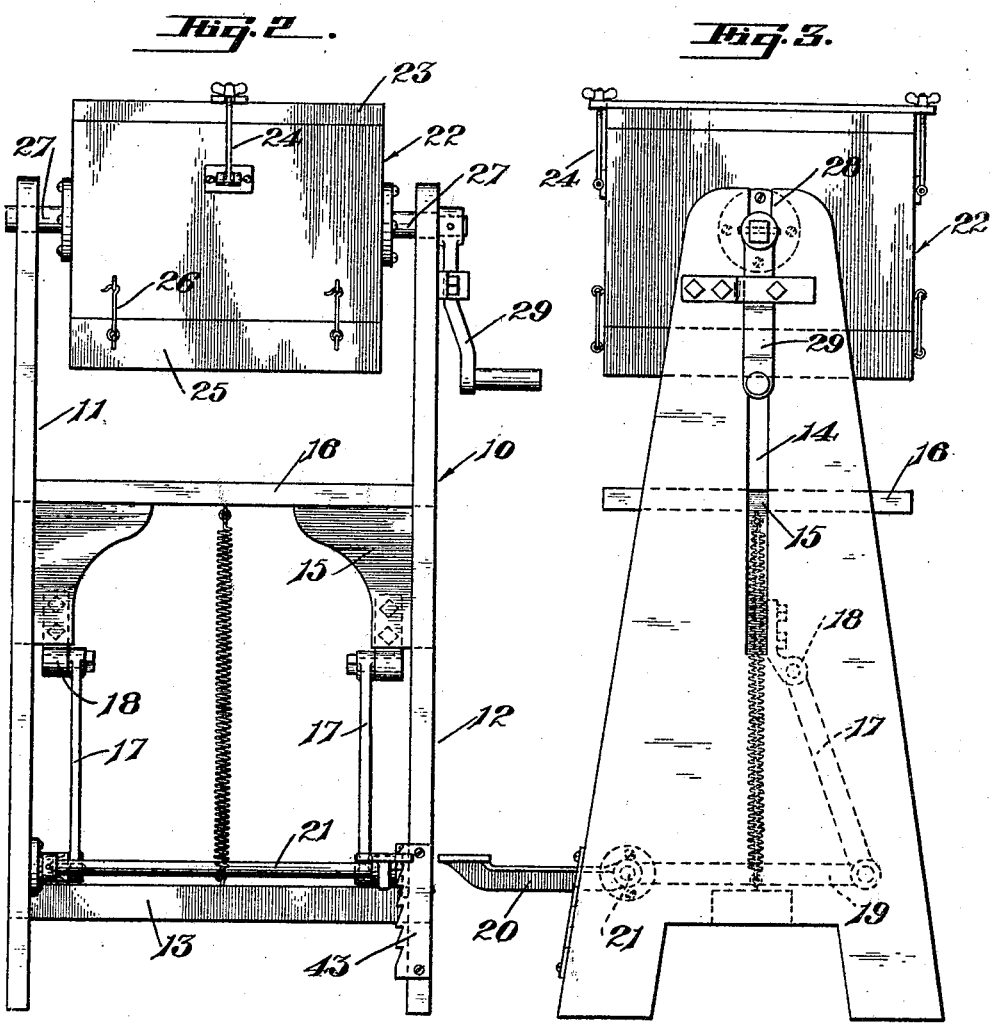

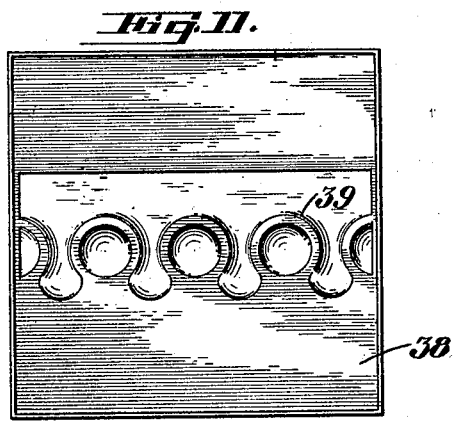
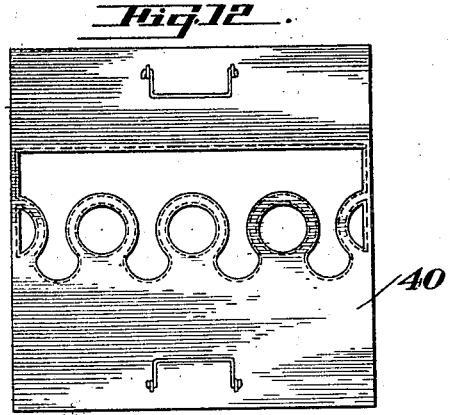
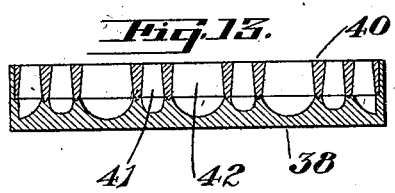

Patented Dec. 12, 1922.

1,438,506

UNITED STATES PATENT OFFICE.

WILBERT T. SPRING, OF SAN FRANCISCO, CALIFORNIA.

APPARATUS FOR PRODUCING CONCRETE AND PLASTIC WORK.

Application filed April 27, 1921. Serial No. 464,915.

*To all whom it may concern:*

Be it known that I, WILBERT T. SPRING, a citizen of the United States, residing at San Francisco, in the county of San Francisco and State of California, have invented new and useful Improvements in Apparatus for Producing Concrete and Plastic Work, of which the following is a specification.

This invention relates to an apparatus for producing mosaic work from plastic material.

Heretofore it has been common practice to produce mosaic work by the use of various elements of solid material which have been combined to carry out a design, and it is the principal object of the present invention to arrive at substantially the same result by forming mosaic surfaces from plastic material, the elements of which are applied and combined, thereafter setting to produce a solid surface upon which the design appears, it being preferable to employ cementitious material in carrying out the invention.

The present invention contemplates the use of a form, in conjunction with which a plurality of mold boards may be used, said boards supplying the necessary molds for the various mosaic elements to be produced, and said molds being mounted upon a molding machine adapted to support the structure during the molding operation, and to thereafter turn it from the molds.

The invention is illustrated by way of example in the accompanying drawings, in which:

Fig. 1 is a view in perspective, showing the complete mold machine.

Fig. 2 is a view in front elevation showing the machine.

Fig. 3 is a view in side elevation showing the construction of the molding machine.

Fig. 4 is a view in transverse section showing the first step in a molding operation, and particularly disclosing the use of a center mold.

Fig. 5 is a view in transverse section showing the second step of the molding operation, and disclosing a rosette mold.

Fig. 6 is a view in transverse section showing the rosette completed.

Fig. 7 is a view in vertical section through the complete mold structure.

Fig. 8 is a view in plan showing the rosette as formed in Fig. 6.

Fig. 9 is a view in plan showing the center mold used as disclosed in Fig. 4.

Fig. 10 is a view in plan showing the rosette mold.

Fig. 11 is a view in plan showing the first step in forming a conventional design between the body and centers of which other colors may be placed.

Fig. 12 is a view showing the second step in this operation.

Fig. 13 is a view in transverse section showing the structure formed.

Referring more particularly to the drawings, 10 indicates a molding machine, which is here shown as comprising standards 11 and 12 connected by a cross bar 13. These standards carry longitudinal slots 14, which receive sliding blocks 15 of a receiving table 16. This arrangement makes it possible for the table to remain in horizontal alignment while being vertically moved.

The operating mechanism of the table is more clearly shown in Figs. 2 and 3, where it will be seen that pitman rods 17 are pivoted by brackets 18 to the sliding blocks 15, while their lower ends are pivoted to a lever extension 19 of a foot tread 20. This tread extends forwardly from the machine at a point near the ground and is pivoted upon a horizontal shaft 21. By depressing the tread member 20 the receiving table 16 may be raised.

Rotatably mounted at the top of the standards 11 is a mold flask 22. This flask comprises a removable top board 23 held in position by clamping stirrups 24. The body of the flask is rectangular and may support mold frames 25 at its bottom. These frames are detachably secured by hooks 26. It is to be understood that flasks of various sizes might be used, and that thin slabs can be made as well as thicker blocks. In any event the flasks are provided at opposite ends with trunnions 27 which extend through bearing slots 28 at the tops of the frame members 11. One of these trunnions is fitted with a crank 29 by which the flask may be rotated.

Interchangeable mold units are used in connection with the flask to produce a desired mosaic design upon the surface of the block being formed. It is to be understood that these mold units may carry out any motif desired, and that by way of example the molds required for forming a rosette and a border design will be shown in the present case. A mold print 30 is first provided, said print having recesses 31 in the face thereof to represent the petals of a rosette. In this instance these petals will stand out in relief upon the surface of the slab. This mold print is formed with a marginal flange 32 to receive various mold boards. As shown in Fig. 4, a center mold board 33 is provided. This board is formed with a central opening 34 therein, which is in register with a center recess 35 in the mold print. It is desirable to form the various openings in the mold board with sufficient draft to permit the molds to be readily removed without disturbing the inlays formed thereby. The body portion of the rosettes may be formed by interchanging the center board 33 for a rosette board 36 which has a central opening 37 therethrough, agreeing in configuration with the marginal edge of the recesses 31 in the mold board as shown in Figs. 8 and 10. The mold print carries the fastening member 26 by which it may be secured to the body of the flask 22.

The mold structure disclosed in Figs. 11, 12 and 13 are provided to form designs which are inlaid in a body of material of another color. Referring to Fig. 11, a print board 38 is shown, being recessed to form a ridge as indicated at 39, the remainder of the board being relieved. When this portion is filled level with the top of the board a mold board 40 may be placed thereover. This board has mold members registering with the ridges 39 of the print, as clearly shown in Fig. 13, thus forming a series of pockets 41 and 42, into which a plastic material of a desired color may be placed, after which the mold member is removed and other colored material is filled in the voids made by the mold.

In operation of the present invention, a print board 30 is mounted upon the receiving table 16, while this table stands in its lowermost position, and the flask is removed. When the design of a rosette is to be formed for example, the mold board 33 is placed over the print and plastic material of a desired color is filled in the pocket formed by the recess 35 of the print and the opening 34 of the mold board. The mold board 33 may then be removed and a rosette board placed thereover. The pockets formed by the openings 35 of the rosette board and the recesses 31 of the mold board may then be filled in with plastic material of another color to form the mass representing the petals of the rosette. After this has been done the rosette board is removed and by depressing the pedal or tread member 20, the receiving table may be elevated to bring the print directly beneath an opened flask which has been mounted upon the standards of the molding machine and is held in its overturned position by a stop member 43. The print board may then be fastened to the flask by the hooks 26, after which the flask is completely filled with plastic material to form a slab of a desired thickness. The bottom board 23 is then secured in place and the flask thereafter turned over to expose the mold board at the top. The receiving table may then be elevated to a supporting position beneath the flask and the molds and the flask thereafter removed. When the receiving table is again lowered the lower block or slab may be carried away on the board 23 and allowed to set. It will thus be seen that by this method plastic mosaic work may be formed upon a plane surface or may be carried out in relief if desired.

The method of procedure when using other forms of mold boards, as for example the boards shown in Figs. 11 to 13, inclusive, will be substantially the same as previously described.

It will thus be seen that the present invention provides simple means whereby artistic designs may be formed in plastic materials such as cement, said designs being smooth or in relief, and in any color desired.

While I have shown the preferred form of my invention as now known to me, it will be understood that various changes might be arranged in the combination of parts, without departing from the spirit of the invention as claimed.

Having thus described my invention, what I claim and desire to secure by Letters Patent is:

1. An apparatus for producing mosaic or the like, comprising a flask, a print board adapted to be detachably secured to the bottom thereof, a shaft upon which the flask is mounted, and means by which the shaft may be turned and the flask inverted.

2. A mosaic forming apparatus comprising a flask, a print board having a surrounding flange within which the lower end of the flask is adapted to nest, means for detachably securing said print board to said flask, and a turnable support for said flask whereby it may be inverted.

3. A mosaic forming apparatus, including a frame of vertically slotted standards, a horizontal table carried by sliding blocks which are guided in the slots, a treadle member in the lower part of the frame and connecting rods through which the table may be raised or depressed, and a latch or stop, holding member, a print board, a flask mounted and turnable on a crank shaft, said board having flanges in which the flask may fit, and securing means therefor, a cover for the flask to retain the mold in place when the structure is inverted.

4. In a mosaic forming apparatus a frame of vertically slotted standards, a mold receiving table, and treadle mechanism by which the table may be raised or lowered, and a latch to retain it in the desired position, a mold print board recessed and having raised ridges to form pockets to receive plastic material, a flask, said print board being formed with surrounding flanges within which the flask may be inserted, a cover for the flask and a crank shaft upon which the flask is mounted, and reversible when the table has been withdrawn.

5. A mold structure for producing mosaic work from plastic material comprising a series of complementary mold members within which various elements of a design may be formed of plastic material, and may be arranged in proper relation to each other, and a flask adapted to be disposed over the design thus formed, and within which plastic material may be placed to produce a slab incorporating the design upon one of its faces, and mechanism to invert the flask and the contained print member.

WILBERT T. SPRING.